United States Patent [19]

Mizuhara

[11] Patent Number: 4,603,090
[45] Date of Patent: Jul. 29, 1986

[54] DUCTILE TITANIUM-INDIUM-COPPER BRAZING ALLOY

[75] Inventor: Howard Mizuhara, Hillsborough, Calif.

[73] Assignee: GTE Products Corporation, Stamford, Conn.

[21] Appl. No.: 596,998

[22] Filed: Apr. 5, 1984

[51] Int. Cl.⁴ .................... C22C 9/00; C22C 9/01
[52] U.S. Cl. ............................. 428/606; 420/489; 420/492; 420/497; 420/469; 219/85 H; 228/263.11
[58] Field of Search ........... 428/606; 420/489, 492, 420/495, 497, 493, 485, 486, 487, 488, 470, 469, 471, 473; 148/433, 434, 435, 436; 219/146.22, 85 H; 228/56, 263.11

[56] References Cited

U.S. PATENT DOCUMENTS

| | | | |
|---|---|---|---|
| 4,071,358 | 1/1978 | Kawakatsu | 420/473 |
| 4,357,299 | 11/1982 | Pattanaik | 420/493 |
| 4,426,033 | 1/1984 | Mizuhara | 428/606 |

FOREIGN PATENT DOCUMENTS

| | | | |
|---|---|---|---|
| 2243731 | 3/1974 | Fed. Rep. of Germany | 420/492 |
| 0001722 | 1/1967 | Japan | 420/486 |
| 0504179 | 2/1975 | Japan | 420/489 |
| 0524451 | 1/1977 | Japan | 420/473 |
| 0488875 | 2/1976 | U.S.S.R. | 420/489 |

*Primary Examiner*—L. Dewayne Rutledge
*Assistant Examiner*—Deborah Yee
*Attorney, Agent, or Firm*—Donald R. Castle

[57] ABSTRACT

Brazing alloys of copper-indium-titanium alloy can be used to braze ceramic to metal. Other elements such as gold, manganese, palladium, nickel, aluminum, tin singly or in combination can also be added.

5 Claims, No Drawings

DUCTILE TITANIUM-INDIUM-COPPER BRAZING ALLOY

FIELD OF INVENTION

This invention relates to brazing alloys. More particularly it relates to low temperature brazing alloys containing reactive metals selected from the group consisting of vanadium, zirconium, titanium, and mixtures thereof and indium and copper.

BACKGROUND

An alloy sold under the tradename of Ticusil by the Wesgo Division of GTE Products Corporation, Belmont, Calif. contains 4.5% by weight of titanium, 68.8% by weight of silver and 26.7% by weight of copper. This alloy, while having the ability to wet various ceramic materials and has a relatively low brazing temperature, and upon brazing contains a brittle dispersed phase.

Other titanium containing alloys containing higher amounts titanium are known to wet ceramics but they are brittle. These can be made into a flexible foil form by rapid solidification techniques, however, upon brazing it will form a brittle alloy joint.

When brazing brittle ceramic to metal components with different coefficiences of thermal expansion, the reliability of brazed joint is highly dependent on the brazing alloy ductility, because the ductile alloy will minimize the stress between two different materials. Brittle alloys when used for brazing brittle notch sensitive ceramic to metal result in the ceramic almost always failing after being exposed to a relatively few thermal cycles.

SUMMARY OF THE INVENTION

Reactive metal-indium-copper brazing alloys have liquidus temperatures in the range of from about 850° C. to about 1250° C. are ductile and after brazing are relatively free of hard dispersed phases. The alloys of this invention can contain as optional ingredients specified amounts of gold, manganese, palladium, nickel, tin, aluminum, and mixtures thereof.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal can not appreciably exceed 5% by weight and achieve a ductile material which upon brazing is free of dispersed phases.

In many brazing applications it is desired to utilize an intermediate brazing temperature, that is the liquidus of the alloy should be in about the range of from about 850° C. to about 1250° C.

While the liquidus temperature is in the ranges specified, the flow temperature, that is the temperature at which the alloys of this invention flow and wet the materials to be brazed is important in utilizing the materials using conventional brazing techniques. It is preferred to utilize the lowest brazing temperatures that meets the application temperature. The flow temperatures for the products of this invention generally range from about 900° C. to about 1200° C.

The amount of the reactive metal in the alloys is from about 0.1% by weight to about 5% by weight with from about 1.0% by weight to about 3% by weight being preferred.

Titanium is the preferred reactive metal however, both vanadium and zirconium can be used either alone or in mixtures with each other or in conjunction with titanium.

The second metal in the system is indium and will be present in amounts of from about 0.1% by weight to about 30% by weight. The addition of about 1% to about 10% by weight indium to copper-titanium alloy also improves wetting of difficult to wet ceramic material. The amount of copper, the third essential element, will be varied within the range of from about 65% by weight to about 99.8% of the reactive metal-indium-copper system and the maximum of about 40% by weight of the alloy of optional ingredients can be used so that the liquidus temperature of the alloy is within the range of from about 850° C. to about 1250° C.

Gold, palladium, manganese and mixtures thereof constitute the first optional group of metals. The first optional group is added in amounts of from 0 to about 40% of the alloy. Amounts of the first optional ingredient from about 5% to about 20% by weight are preferred. The second optional metal is nickel and can be present in amounts of from 0 to about 30% by weight with from about 5% to about 15% being preferred. Tin is the optional third metal, it is generally used in amounts of from 1% to about 20% by weight with from about 3% to about 10% by weight being preferred. Aluminum is also an optional metal, it is generally used in the amount from 0.5% to about 15% by weight with 3% to 10% by weight of aluminum being preferred. The combination of optional ingredients can not exceed about 40% by weight of the alloy. In any event, the alloys of this invention have a liquidus temperature of from about 850° C. to about 1250° C.

To more fully illustrate the subject invention the following detailed examples are presented. All parts, percentages and proportions are by weight unless otherwise indicated.

EXAMPLE 1

An alloy of about 10% indium, about 2% titanium and about 88% copper is melted in a small button melter and rolled down to 4 mil foil. The alloy is placed between 2 ground alumina substrates and heated to about 1030° C. in a $10^{-5}$ mm Hg vacuum. The alloy melts and forms a sound brazed bond.

EXAMPLE 2

An alloy of about 1% In, about 3% Ti about 5% Al, 91% Cu is melted in a small button melter. The button is rolled down to 5 mil thickness. The alloy foil is placed between a Kovar 10 mil sheet and an alumina disc 0.100" thick by 1" diameter and is heated to about 1090° C. and held for about 5 minutes under about $10^{-5}$ mm Hg vacuum then cooled under vacuum. The resulting bond is extremely strong.

EXAMPLE 3

An alloy of about 0.5% In about 3% Ti about 36% Mn about 60.5% Cu is prepared in a button melter and is rolled down to about a 5 mil thick foil. The 5 mil foil is placed between an alumina ceramic substrate and a 10 mil thick nickel strip, and is brazed under about $10^{-5}$ mm Hg vacuum at about 920° C. for about 6 minutes.

The brazed joint requires on a ¼" nickel strip about 10 lbs pull to peel off the ceramic.

EXAMPLE 4

An alloy consisting essentially of about 0.5% In, about 2% Ti, about 10% Ni and about 87.5% copper is button melted and rolled down to a foil having about a piece of the foil is placed between 2 alumina substrates and heated to about 1180° C. for about 10 minutes under about $10^{-5}$ mm Hg vacuum. An excellent bond is obtained.

EXAMPLE 5

An alloy consisting essentially of about 87.5% Cu is about 0.5% In, about 2% Ti, about 10% Ni is rolled down to about a 5 mil thick foil. The foil is placed between 410 stainless steel and an alumnina ceramic and brazed at about 1175° C. under about $10^{-5}$ mm Hg vacuum with excellent results.

EXAMPLE 6

An alloy with a composition of about 5% In, about 2% Ti, about 5% Sn, about 88% Cu is melted in a small button melter and upon cooling, is rolled down into a foil having a thickness of about 6 mils. The foil is placed between 1010 steel 1"×1"×0.050" and a ¾" diameter by ¼" thick silicon nitride disc and heated to about 1030° C. for about 5 minutes under about $10^{-5}$ mm Hg vacuum. The braze flows well and the joint is very sound.

What is claimed is:

1. An article consisting essentially of a ductile brazing foil suitable for brazing ceramic and having a composition consisting essentially of from about 0.1% about 5% by weight of a reactive metal selected from the group consisting of titanium, zirconium, vanadium and mixtures thereof, from about 1.0% to about 30% by weight of indium, from about 50% to about 99.8% by weight of copper.

2. A brazing foil consisting essentially of a ductile brazing alloy having a composition consisting essentially of from 0.1% to about 5% by weight of a reactive metal selected from the group consisting of titanium, zirconium, vanadium and mixtures thereof, from about 1.0% to about 30% by weight of indium, from about 3% to about 10% by weight of aluminum, balance copper.

3. A brazing foil consisting essentially of a ductile brazing alloy having a composition consisting essentially of from about 0.1% to about 5% by weight of a reactive metal selected from the group consisting of titanium, zirconium, vanadium and mixtures thereof, from about 1.5% to about 3% by weight of indium, from about 5% to about 20% of a precious metal selected from the group consisting of gold, palladium and mixtures thereof, balance copper.

4. An foil according to claim 3 wherein said precious metal is gold.

5. An foil according to claim 2 wherein said precious metal is palladium.

* * * * *